UNITED STATES PATENT OFFICE.

PETER TOWNSEND AUSTEN, OF NEW BRUNSWICK, NEW JERSEY, ASSIGNOR TO THE WILLIAM J. MATHESON & COMPANY, LIMITED, OF NEW YORK, N. Y.

PROCESS OF CURING LOGWOOD-CHIPS.

SPECIFICATION forming part of Letters Patent No. 494,237, dated March 28, 1893.

Application filed January 10, 1893. Serial No. 457,930. (No specimens.)

*To all whom it may concern:*

Be it known that I, PETER TOWNSEND AUSTEN, a citizen of the United States, and a resident of New Brunswick, in the county of Middlesex and State of New Jersey, have invented a certain new and useful Process of Curing Logwood-Chips, of which the following is a specification.

The usual method of curing logwood chips consists in moistening them with water or water made alkaline with sodium carbonate, sodium silicate or other alkaline substances, and allowing them to stand in heaps at a temperature of 70° Fahrenheit or thereabout. A fermentation and oxidation soon begins, to assist which, and also to aid the drying, the chips are repeatedly spread out and shoveled into new heaps to expose fresh surfaces to the air. The result of the fermentation and oxidation is to convert the hematoxylin into hematin, and to destroy to a greater or less extent, depending on the success of the operation, the glucosides and the resinous matters existing in the wood, and which injure the dyestuff. The finished cured chips show on their surfaces a bronze luster, caused it is assumed by minute crystals of hematin. They yield to water a rich, bloomy color which is easily soluble, and which is free from the yellow resinous and difficultly soluble matter of the fresh chip. The process, however, is uncertain and unsatisfactory, because it is difficult to observe the conditions on which success depends. If the temperature to which the chips are exposed is too high, or the fermentation proceeds too rapidly, the chips may be only superficially oxidized, or may be superoxidized, in either of which cases, the color obtained is not satisfactory. In the former case it may still contain the yellow extractive matter, and in the latter, the color may pass into brownish or off-shades, or if the temperature is too low, the curing proceeds very slowly, if at all, and a poor product is obtained. Thus, to obtain satisfactory results by the process in use, great skill and a perfect control of the conditions are necessary. Experience shows that even with the best skill and most perfect control of conditions, the cured chips will vary considerably in value. To carry out this process a large amount of room is necessary, as the process lasts several weeks, during which time the chips must be handled every day, and a certain temperature kept up. Manufacturers are thus compelled to carry a large stock of cured chips or take the risk of being unable to fill orders for several weeks.

The process which I have invented produces a chip, equal, if not superior, to the chip cured by the old process. The operation can be carried out in a small space, thus saving the expense of buildings, heating, extensive and expensive water-tight floors, &c. The handling of the chips can be reduced to a minimum, or can be done entirely mechanically thus saving largely in labor. As the time of the operation is reduced to hours instead of days, the finished article can be turned out in time to meet the demand, and, as the conditions to successful treatment are made less complicated, the product can be made much more uniform.

My process is substantially as follows:—The dry chips are moistened by sprinkling by hand, or mechanically, with a solution of nitrite of soda, or potash, or other suitable nitrite, dissolved in water, and are well mixed to insure even wetting. They are then allowed to stand several hours so as to allow the liquid to soak into and be well absorbed by the chips. The chips thus evenly moistened are at once dried in any suitable way as in heated rooms, or in revolving drums through which warm air is passed, &c. When the state of dryness required is reached, the chips are ready for use.

The different kinds of logwood require different amounts of the alkali nitrite to effect the curing, as the amounts of coloring matter and resinous matters vary in the different kinds of wood. As an example, I will give the treatment and amounts used with a high grade of Gonaïves chips. One hundred pounds of Gonaïves chips were sprinkled with a solution of one pound of nitrite of soda in about two and one-half gallons of water. The chips were well shoveled to insure even moistening and then allowed to stand six hours to thoroughly absorb the liquid. They were then placed in a drying chamber heated to 120° Fahrenheit, and allowed to dry. The extent to which the drying is carried will depend on circumstances, some users requiring dryer chips than others. The cured chips thus produced are equal if not superior, to those cured in the ordinary way, they give up to water, a fine bloomy color, free from resinous matters and yellow color.

Having thus described my invention, what I claim as new, and desire to patent, is—

1. The process of rapidly curing chip logwood, which consists in adding to logwood chips a solution of a suitable nitrite, substantially as hereinbefore described.

2. The cured logwood chips consisting of logwood chips with which has been incorporated a suitable nitrite, substantially as described.

Signed at New York city, in the county of New York and State of New York, this 7th day of January, A. D. 1893.

PETER TOWNSEND AUSTEN.

Witnesses:
 GEO. B. DEANE,
 W. J. MATHESON.